Jan. 14, 1936. L. R. GODOWN 2,027,971
WINDSHIELD WIPING BLADE
Filed June 9, 1934
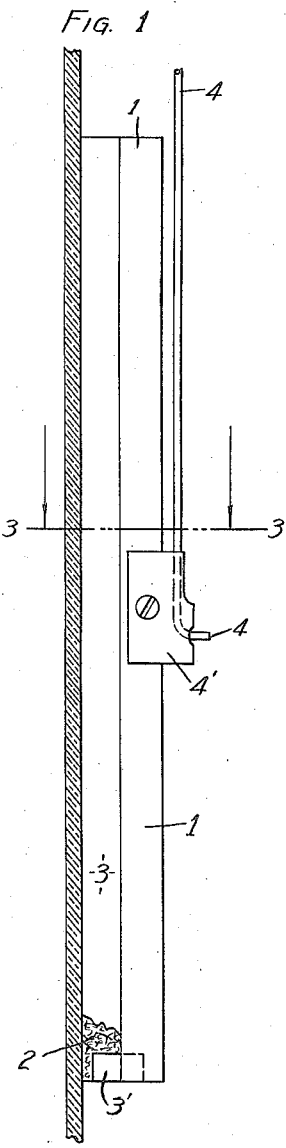
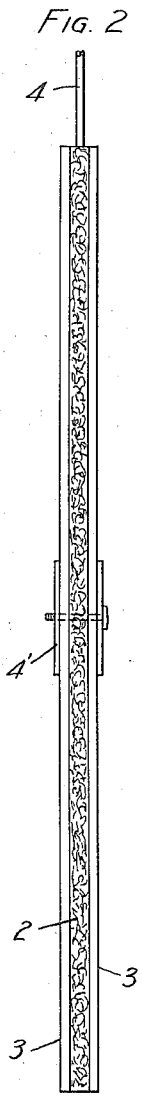
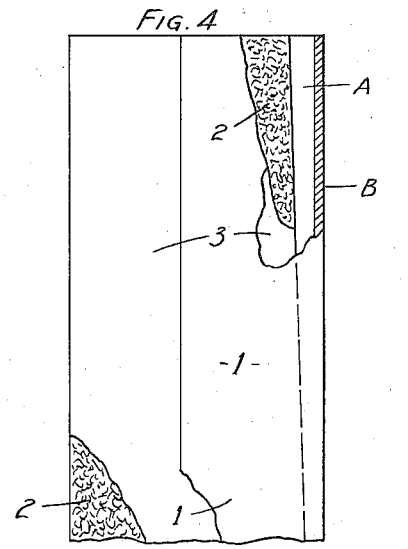
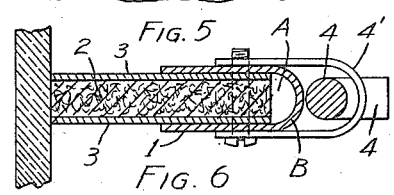
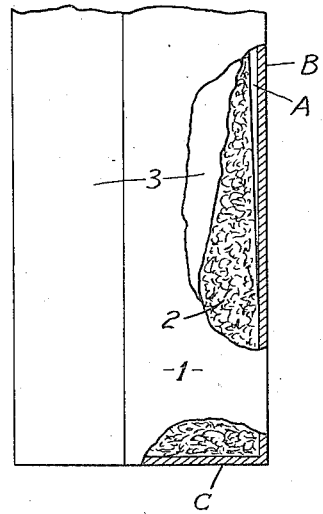
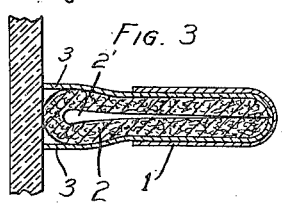
INVENTOR.
LEE R. GODOWN
BY U.Y. Charles
ATTORNEY.

Patented Jan. 14, 1936

2,027,971

UNITED STATES PATENT OFFICE 2,027,971

WINDSHIELD WIPING BLADE

Lee R. Godown, Kingman, Kans., assignor of one-fifth to Vern L. Cline, Kingman, Kans.

Application June 9, 1934, Serial No. 729,769

1 Claim. (Cl. 15—250)

My invention relates to a windshield wiping blade.

The object of my invention is to provide a blade that is an all season device, that is to say the blade is so constructed that it will operate for the removal of moisture accumulation upon the surface of the windshield as the result of rain, fog or the like and also for the removal of frost, snow or ice accumulation during seasons of low temperature.

A further object of my invention is to provide a wiping blade having an element subject to saturation as means to apply an exterminating fluid for ice like deposits upon the windshield of a motor driven vehicle, which deposits are often to the extent that normal vision through the windshield is greatly impaired rendering it impossible to drive with safety.

A still further object of my invention is to provide a flexible nonsaturative cover for each side of the absorbent element to avoid evaporation and also to prevent dust or other sediment contacting therewith as the abrasive effect of such is injurious to the surface of the glass shield during reciprocating movement of the blade.

A still further object of my invention is to provide a wiping blade inexpensive to make, efficient in service, uncumbersome, and adaptable to any standard make of reciprocator arm such as commonly employed at the present time.

These and other objects will hereinafter be more fully explained, reference being had to the accompanying drawing forming a part of this specification and wherein like characters will apply to like parts in the different views.

Referring to the drawing,

Figure 1 is a side view of the blade and sectional view of the glass.

Figure 2 is a rear edge view thereof.

Figure 3 is an enlarged cross section taken on line 3—3 in Figure 1.

Figure 4 is an enlarged view of the upper portion of the blade as modified parts removed for convenience of illustration.

Figure 5 is a cross section above the clip.

Figure 6 is a view of the lower portion of the blade, partly in section to show certain modifications later described.

The assembly of parts constituting my invention consist of a body portion 1, said body portion being a U shaped channel with respect to cross section, the legs of which are parallel to each other and between which is positioned and secured therein a flexible absorbent fiber member 2, having secured to each side thereof as a covering therefor a flexible nonabsorbent sheet 3, the said absorbent element and sheets extending outward equally from the legs of the said body portion and carried thereby reciprocatingly upon the arc of an arm 4 that is actuated by a reciprocating device secured to the frame of the glass in working relation thereto, the device and frame not shown in the drawing; the lower end of the said arm is attached near the center of the blade by means of a clip 4' that is secured to the body.

In Figure 3 is shown the arrangement consisting of a two-ply absorbent wick body by lapping the same back on itself, the edges of which are positioned inward to close contact with the back of the channel while the fold medially is free to flex and be partially open as shown at 2' to receive a quantity of fluid to saturate the said absorbent element, and to retain the said fluid therein, I have placed a plug 3' of suitable material to close the lower end of the opening; it will be understood, however, that the said opening may be very slight, but sufficient that fluid injected therein by the aid of an oil can or the like will be inclined to flow downward freely saturating the entire absorbent body 2, and being so arranged will insure immediate saturation at the point of contact with the windshield glass and continuously applying the fluid from the medial fold thereof, and furthermore, the outward flow tendency of the fluid is intensified by bending the wick to and fro as the blade moves reciprocatingly, and at all times the nonabsorbent sheets 3 engaging closely to the outsides of the wick is a means to retain the fluid in the principal body of the said wick as well as to protect against sediment settling thereon and being emulsified by the fluid which would result in an abrasive effect that would be injurious to the glass.

In Figures 4, 5, and 6 is shown a space A between the inner edge of the wick and the arcuate portion B of the U shaped body functioning as a reservoir for a liquid such as wood alcohol and glycerin proportionately mixed but not confined to such chemicals alone. The said space is of greater width at the top and diminishing near the lower end thereof as shown in Figure 6, and in said figure is shown a bottom C which is a modification to avoid excess dripping of the fluid from the lower end thereof.

The said sheets 3 are preferably of rubber to prevent rapid evaporation from the sides of the fluid saturated fibrous element. The fluid, however, is free to exhume through the said element as spread by the outer edge thereof upon the windshield.

It will be understood that the wiper blade herein disclosed will function as remover of moisture such as accumulates in mild weather during rain or dense fog in which case the application of fluid is omitted. Such modification may be employed as lie within the scope of the appended claim.

Having fully described my invention, what I claim as new and desire to secure by Letters Patent, is:

In a windshield wiping blade of the class described, comprising a channel body and means to attach the same to the free end of a reciprocator arm as actuating means for the blade upon a windshield, a fibrous element with rubber sides, a marginal edge of which is clamped within the channel slantingly with respect to the channel longitudinally, providing an open space between the element and channel converging downward and closing a spaced distance from the lower end of the channel substantially as shown.

LEE R. GODOWN.